United States Patent [19]
Wooller

[11] Patent Number: 4,903,017
[45] Date of Patent: Feb. 20, 1990

[54] AIRCRAFT DISPLAY DEVICES

[75] Inventor: Frank R. Wooller, Kent, England

[73] Assignee: GEC-Marconi Limited, England

[21] Appl. No.: 325,662

[22] Filed: Mar. 20, 1989

Related U.S. Application Data

[63] Continuation of Ser. No. 40,227, Apr. 20, 1987, abandoned.

[30] Foreign Application Priority Data

Apr. 23, 1986 [GB] United Kingdom ............... 8609931

[51] Int. Cl.$^4$ ............................................. G08B 23/00
[52] U.S. Cl. ................................ 340/975; 73/178 R; 340/967
[58] Field of Search ............... 340/967, 971, 973, 974, 340/975, 705, 784; 73/178 R; 434/51; 33/328; 358/104; 364/434, 424.06; 244/1 R

[56] References Cited

U.S. PATENT DOCUMENTS 3,018,661 1/1962 Meredith et al. ................. 73/178 R
4,583,094 4/1986 Mosier ................................. 340/967

FOREIGN PATENT DOCUMENTS 2131225 6/1984 United Kingdom .

Primary Examiner—Joseph A. Orsino
Assistant Examiner—Brent A. Swarthout
Attorney, Agent, or Firm—Kirschstein, Ottinger, Israel & Schiffmiller

[57] ABSTRACT

A display device for use as an attitude display in an aircraft comprising a circular array (5) of selectively activatable display elements, the elements being disposed in equally angularly spaced radially extending lines, each line having the same number of elements with corresponding elements in the different lines at the same radial distance from the center of the array (5); and a controller (3) for selectively activating said display elements in accordance with aircraft attitude whereby the selected elements form a visible pattern indicative of the aircraft attitude.

9 Claims, 6 Drawing Sheets

AIRCRAFT DISPLAY DEVICES

This is a continuation of application Ser. No. 040,227, filed Apr. 20, 1987, now abandoned.

BACKGROUND OF THE INVENTION

1. Field of the Invention

This invention relates to aircraft display devices.

More particularly the invention relates to display devices suitable for use as standby attitude reference displays in aircraft.

2. Description of Related Art

The provision of a standby attitude reference display in a modern aircraft cockpit poses a number of problems. The conventional standby electromechanical gyro instrumentation has low reliability leading to high maintenance costs and the possibility of uncertainty as to which instrument to follow when only one standby is available as is often the case in a fighter aircraft due to considerations of cockpit space.

To meet this problem it has been proposed to use for a standby attitude reference a high reliability display device, such as a liquid crystal display, comprising an array of selectively activatable fixed display elements, and to control the selective activation of elements using appropriate ones of the range of aircraft body motion sensors which are incorporated in the complex flight control and other systems provided in modern aircraft.

The difficulty then arises of obtaining with such a relatively simple display device, a display which permits easy transition from the primary attitude display and fits ergonomically into cockpit operation, and which presents to a pilot a readily interpretable, unambiguous and natural attitude representation. In this connection it is desirable in a modern aircraft that the standby attitude reference display should not merely be capable of use as a 'get you home' facility, but should also be capable of use as a recovery instrument i.e. to enable the pilot to recover the aircraft from extreme attitudes.

SUMMARY OF THE INVENTION

It is an object of the present invention to provide a display device suitable for use as a standby attitude reference display which overcomes these difficulties.

According to the present invention a display device for an aircraft comprises: a circular array of selectively activatable display elements, the elements being disposed in equally angularly spaced radially extending lines, each line having the same number of elements with corresponding elements in the different lines at the same radial distance from the centre of the array; and means for selectively activating said display elements in accordance with aircraft attitude whereby the selected elements form a visible pattern indicative of the aircraft attitude.

In a preferred arrangement according to the invention each said element subtends substantially the same angle at the centre of the array and has substantially the same dimension in the radial direction.

In such an arrangement each said element is suitably arranged to be substantially contiguous with each adjacent element.

In one particular device in accordance with the invention said means for selectively activating said display elements activates alternate ones of the elements in a segmental area of the array whose chord moves with respect to the array in a direction normal to its length to depict changes in pitch of the aircraft and whose angle with respect to the array changes to depict changes in roll of the aircraft.

BRIEF DESCRIPTION OF THE DRAWINGS

One display device in accordance with the invention for use as an aircraft standby attitude reference display will now be described, by way of example, with reference to the accompanying drawings in which.

DETAILED DESCRIPTION OF THE PREFERRED EMBODIMENTS

Figure 1:
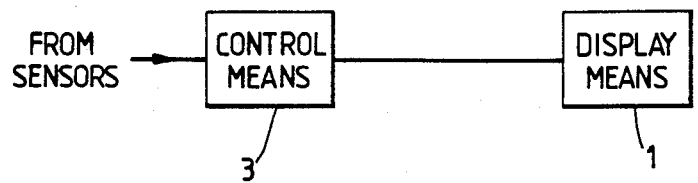
FIG. 1 is a block schematic diagram of the device.

Referring to FIG. 1, the device comprises a display means 1, operated by a control means 3 in response to inputs derived from sensors, more especially pitch and roll sensors, (not shown) mounted in the aircraft.

Figure 2:
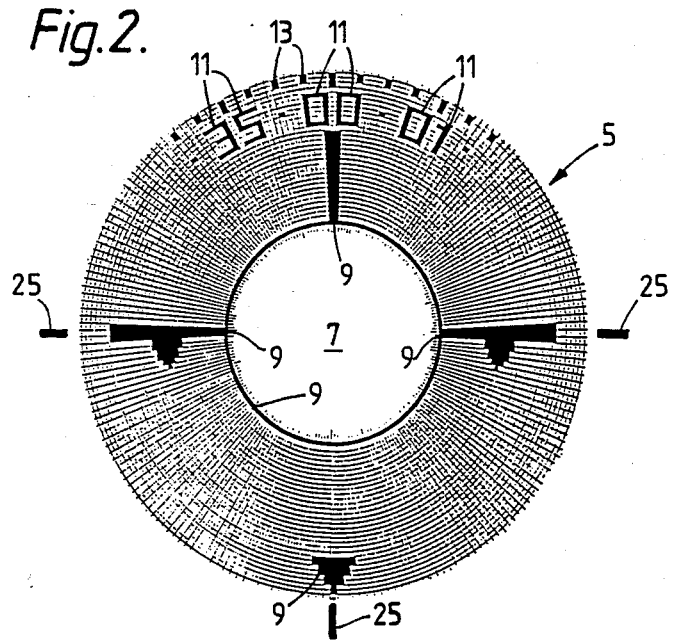
FIG. 2 is a representation of a display means incorporated in the device.

Referring to FIG. 2, the display means comprises a circular array of substantially contiguous display elements 5 which may be individually selectively activated by the control means 3 so as to be in a visible or 'on' condition or an invisible or 'off' condition. The elements are disposed in 216 equally angularly spaced radially extending lines each containing 32 elements, the grid of radial lines and concentric circles in FIG. 2 indicating the boundaries of the elements.

As can be seen in FIG. 2, corresponding elements in the different lines are at the same radial spacing from the centre of the array so that the elements also lie on equally spaced concentric circles.

Each element is of the same radial dimension, but radially outwardly along each line the elements are of progressively greater dimension in the circumferential direction so that each element subtends the same angle at the centre of the array.

The radially inner ends of the lines of elements define a central circular space 7.

The array of display elements 5 may be fabricated using any convenient technology, for example, liquid crystal technology or light emissive diode technology.

In use of the device some of the elements of the array are permanently on to disply symbols, such as 9 in FIG. 2, whose purpose is to indicate the orientation of the aircraft, and thus suitably depict an aircraft, as in FIG. 2.

Further elements of the array may be selectively activated by the control means to present further data to the aircraft pilot, for example digits and markings 11 and 13 to indicate aircraft heading.

To indicate aircraft attitude the control means turns on alternate ones of the elements in each line and concentric circle of elements in a selected segment of the array to create a shading effect in the selected segment.

Figure 3:
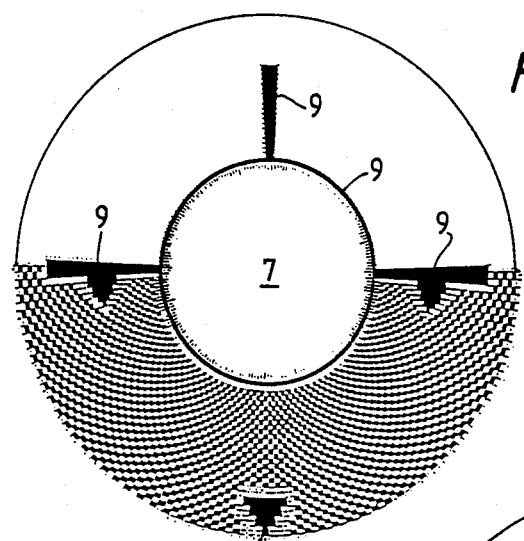
FIGS. 3 to 8 are representations of the display presented by the display means of FIG. 2, for various attitudes of an aircract in which the device is in use.

As shown in FIG. 3, when the aircraft is in straight and level flight the selected segment is the lower half of the array so that the chord of the selected segment, which represents the orientation of the horizon with respect to the aircraft appears aligned with the aircraft wings as represented by the symbols 9. To emphasise the symbols 9, elements of the array 5 immediately adjacent to symbols 9 are inhibited from being turned on.

Figure 4:
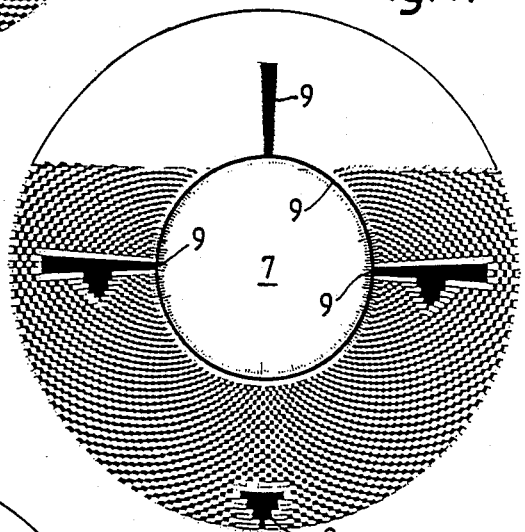
Figure 5:
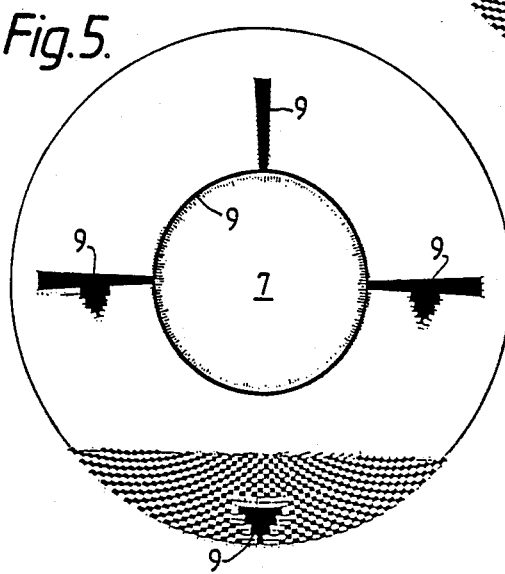

To depict pitch of the aircraft the control means causes the chord of the selected segment to move progressively in a direction normal to its length such as to increase the area of the displayed segment as negative (nose down) pitch angle increases, as illustrated in FIG. 4, and to move progressively in a direction normal to its length such as to decrease the area of the displayed segment as positive (nose up) pitch angle increases, as shown in FIG. 5.

Figure 6:
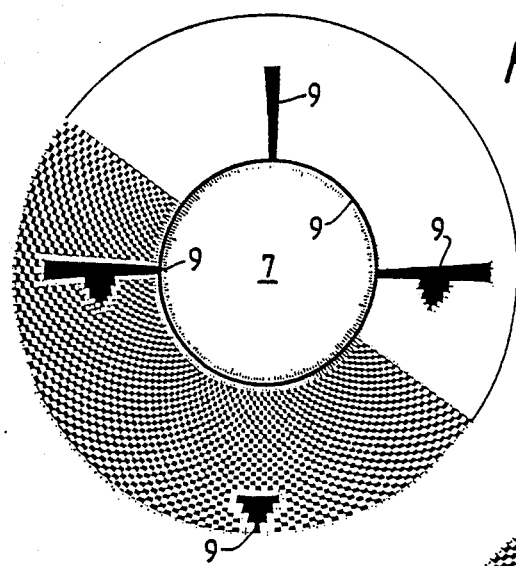
Figure 7:
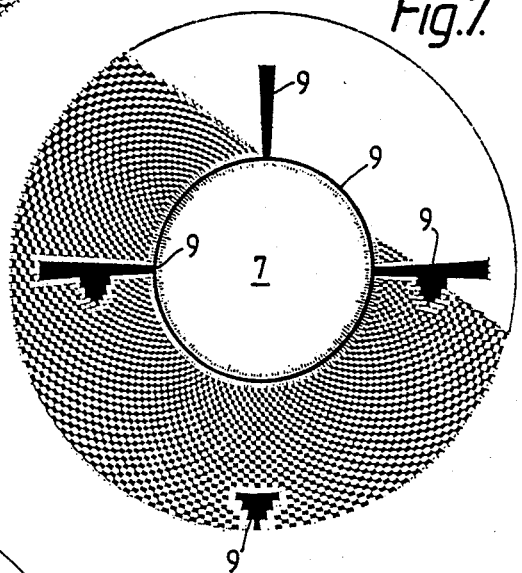
Figure 8:
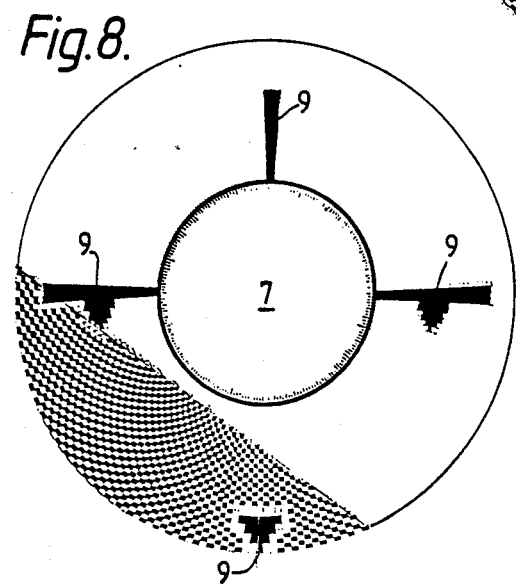

To depict roll of the aircraft the control means causes the chord of the selected segment to rotate with respect to the aircraft representative symbols 9, by an amount equal to the roll angle. Thus FIG. 6 shows the display for a roll to the left with zero pitch, and FIG. 7 the display for a corresponding roll left with negative pitch, and FIG. 8 the display for a corresponding roll left with positive pitch.

Referring now to FIGS. 9 to 14 in a modification of the display means shown in FIG. 2, the orientation of the aircraft is indicated partly by symbols 15 displayed by virtue of some of elements of the array 5 being permanently on, and partly by a symbol 17, separate from the array 5, positioned in the central space 7. The symbol 17 is suitably a permanent printed marking on a glass sheet (not shown) overlaying the display presented by the array 5.

The display presented by the array 5 of the modified display means differs from that presented by the display of FIGS. 3 to 8 in that nominally straight lines 19 are displayed parallel to the chord of the displayed segment, to indicate degree of pitch, and in that a ground marker symbol 21 is provided which moves with aircraft roll.

Otherwise the elements of the array 5 are selectively operated by the control means 3 in essentially the same manner as described above in relation to FIGS. 3 to 8.

Figure 9:
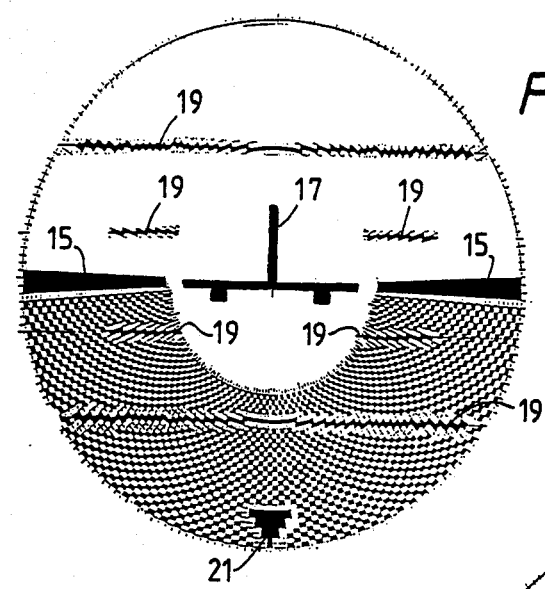
FIGS. 9 to 14 are representations of the display presented by a modification of the display means of FIG. 2 for various attitudes of an aircraft in which the device is in use.
Figure 10:
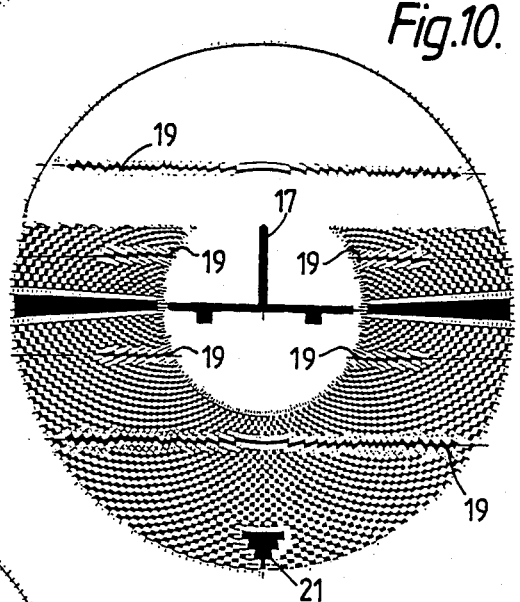
Figure 11:
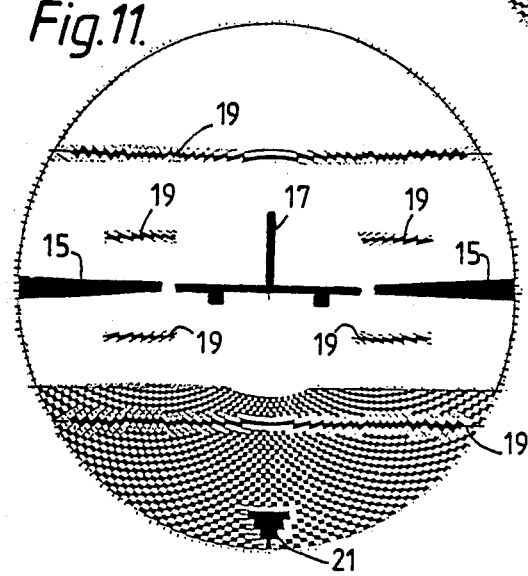
Figure 12:
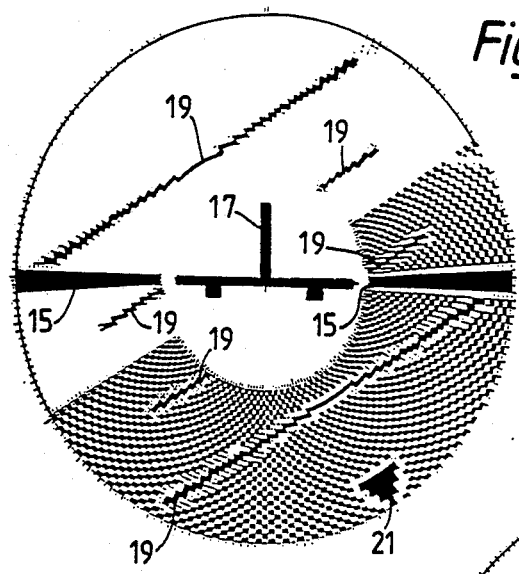
Figure 13:
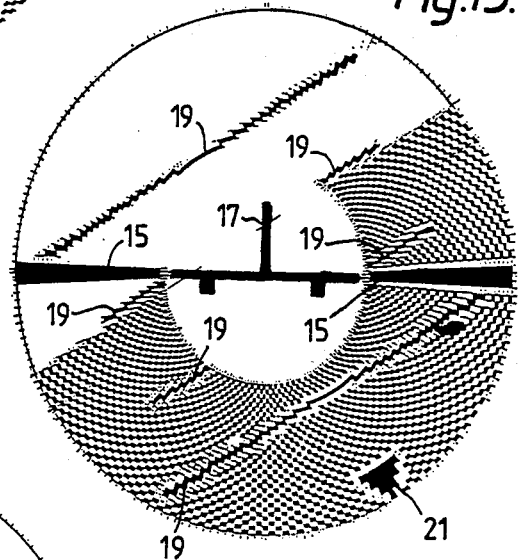
Figure 14:
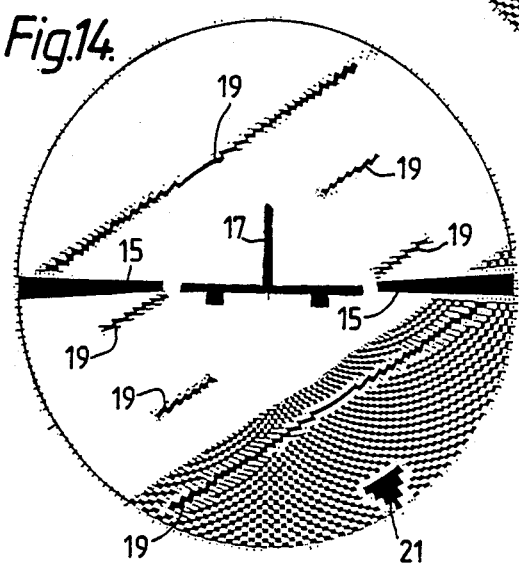
Figure 15:
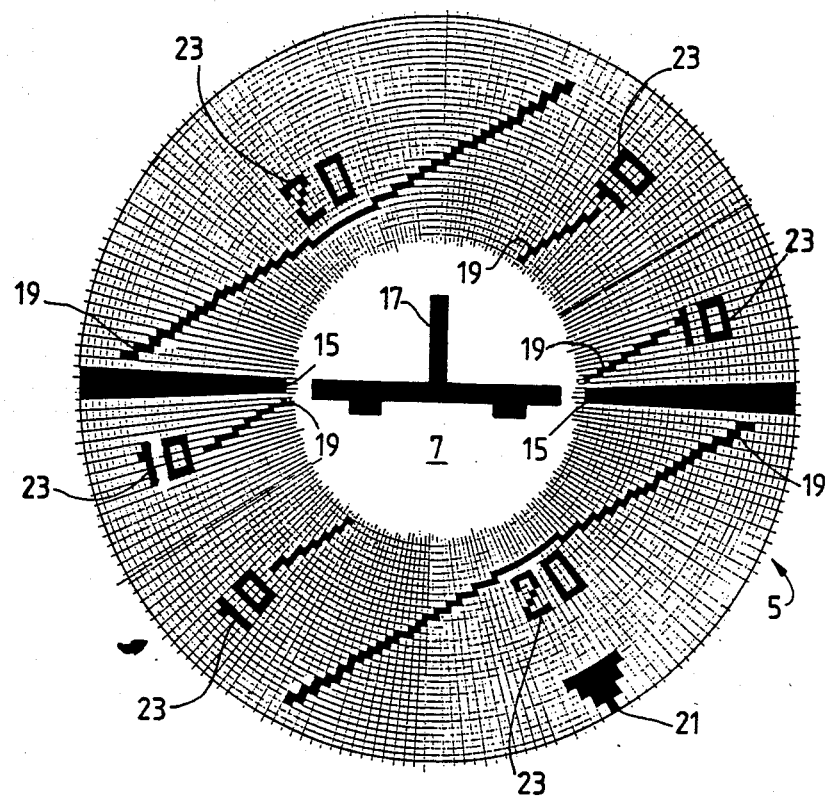
FIG. 15 illustrates a modification of the display presented by the modified display means.

Thus FIG. 9 shows the display produced when the aircraft is in straight and level flight; FIG. 10 shows negative pitch and zero roll; FIG. 11 shows positive pitch and zero roll; FIG. 12 shows zero pitch and right roll; FIG. 13 shows negative pitch and right roll and FIG. 14 shows positive pitch and right roll.

In a modification of the display presented by the display means of FIGS. 9 to 14, appropriate one of the elements of the array 5 are turned on to display digits 23 indicating the numerical values of pitch represented by lines 19.

To provide a better indication of at least smaller degrees of pitch and roll, further markings may be provided around the outside of the array 5, such as permanent markings 25 as shown in FIG. 2. Such markings are of course separate from the array 5, and are suitably carried on a glass plate overlaying the display presented by the array, as in the case of aircraft symbol 17 in FIGS. 9 to 15.

I claim:

1. A display device for an aircraft, comprising:

(A) a circular array including a multitude of selectively activatable display elements, the array having an outer periphery bounding a circular display area having a center,
      (i) the elements being disposed in equally angularly spaced lines extending radially from the center of the display area, each radial line having at least four, and the same number of, elements with corresponding elements in the different radial lines at the same radial distance from the center of the display area,
      (ii) the elements along each radial line occupying a major proportion of the radial line,
      (iii) each said element subtending an angle of substantially the same magnitude at the center of the display area and having a radial dimension of substantially the same magnitude, and
      (iv) each said element being arranged to be substantially contiguous with each adjacent element; and
   (B) means for selectively activating said display elements in accordance with aircraft attitude whereby the selected elements form a visible area and line pattern indicative of the aircraft attitude, said means for selectively activating said display elements activating elements in a segmental area defined by a chord joining extremities of an arcuate portion of the outer periphery of the array, said chord moving with respect to the array in a direction normal to its length to depict changes in pitch of the aircraft and changing its angle with respect to the array to depict changes in roll of the aircraft.

2. A display device according to claim 1, wherein said radially extending lines have inner ends defining a central space in which there are no said display elements.

3. A display device according to claim 1, wherein said display elements activated in said segmental area are alternate ones of said display elements in said segmental area.

4. A display device according to claim 1 wherein said means for activating is arranged to activate selected ones of said display elements to indicate the orientation of the aircraft with respect to the array.

5. A display device according to claim 1 wherein said means for activating is arranged to activate selected ones of said display elements to indicate the aircraft heading.

6. A display device according to claim 1 wherein said means for activating is arranged to activate selected ones of said display elements to indicate the direction of the ground from the aircraft.

7. A display device according to claim 1 wherein said means for activating is arranged to activate selected ones of said display elements to display at least one line substantially parallel to the chord of the displayed segment to indicate a given degree of pitch of the aircraft.

8. A display device according to claim 2 wherein a permanent marking is provided in said central space to indicate the orientation of the aircraft with respect to the array.

9. A display device according to claim 1 having at least one permanent marking positioned outside said array to assist in indicating aircraft attitude.

* * * * *